(12) United States Patent
Marocchi et al.

(10) Patent No.: US 9,336,501 B2
(45) Date of Patent: May 10, 2016

(54) METHOD AND APPARATUS FOR SUPPORTING CROSS JURISDICTIONAL MUTUAL AID REQUESTS

(71) Applicant: MOTOROLA SOLUTIONS, INC., Schaumburg, IL (US)

(72) Inventors: James A. Marocchi, Winfield, IL (US); Ethan Y. Chen, Wilmette, IL (US); Francesca Schuler, Palatine, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 523 days.

(21) Appl. No.: 13/660,528

(22) Filed: Oct. 25, 2012

(65) Prior Publication Data
US 2014/0122721 A1    May 1, 2014

(51) Int. Cl.
*G06F 15/16* (2006.01)
*G06F 15/173* (2006.01)
*G06Q 10/06* (2012.01)

(52) U.S. Cl.
CPC ..................................... *G06Q 10/06* (2013.01)

(58) Field of Classification Search
CPC ... H04L 47/70; H04L 41/00; H04L 29/08144; H04L 67/1002; G06Q 10/06; H04W 76/007; H04W 47/22
USPC ................................ 709/201–203, 224–226
See application file for complete search history.

(56) References Cited

U.S. PATENT DOCUMENTS

| | | | |
|---|---|---|---|
| 7,773,571 B1 | 8/2010 | Maxwell et al. | |
| 7,899,039 B2 | 3/2011 | Andreasen et al. | |
| 2007/0281699 A1 | 12/2007 | Rasanen | |
| 2008/0046963 A1 | 2/2008 | Grayson et al. | |
| 2008/0229385 A1* | 9/2008 | Feder | H04L 12/14 726/1 |
| 2008/0280637 A1* | 11/2008 | Shaffer | H04L 41/069 455/519 |
| 2009/0284348 A1* | 11/2009 | Pfeffer | G08B 25/006 340/7.3 |
| 2011/0065415 A1 | 3/2011 | Miller et al. | |
| 2011/0103266 A1 | 5/2011 | Andreasen et al. | |
| 2011/0171958 A1 | 7/2011 | Hua et al. | |
| 2011/0299395 A1 | 12/2011 | Mariblanca Nieves | |
| 2012/0026880 A1 | 2/2012 | Miller et al. | |
| 2012/0028626 A1 | 2/2012 | Marocchi et al. | |
| 2012/0264394 A1* | 10/2012 | Miller | G06Q 10/06 455/404.1 |

FOREIGN PATENT DOCUMENTS

| | | |
|---|---|---|
| EP | 1 841 275 B1 | 8/2010 |
| WO | 2008/110215 A1 | 9/2008 |
| WO | 2011/034771 A1 | 3/2011 |
| WO | 2012/018462 A1 | 2/2012 |
| WO | 2012/018464 A1 | 2/2012 |

OTHER PUBLICATIONS

Corresponding International Search Report dated Dec. 9, 2014, PCT/US2013/64030.

* cited by examiner

*Primary Examiner* — Edward Kim
(74) *Attorney, Agent, or Firm* — Daniel R. Bestor

(57) ABSTRACT

The same priority is applied to all resources assigned to an incident. A first dispatch system in a first network assigns a network resource in the first network to an incident that occurred in a first jurisdiction. The first dispatch system requests a mutual aid resource from a second dispatch system in a second network subsequent to identifying a resource gap in the first network. The first dispatch system obtains the mutual aid resource from the second dispatch system. A first policy component in the first network receives, from at least one of a first prioritization service in the first network and the at least one second network, at least one of an incident information or a mutual aid information. The first policy component correlates the mutual aid resource with obtained incident information and assigns a same priority to the network resource and the mutual aid resource.

21 Claims, 9 Drawing Sheets

METHOD AND APPARATUS FOR SUPPORTING CROSS JURISDICTIONAL MUTUAL AID REQUESTS

FIELD OF THE DISCLOSURE

The present disclosure relates to exchanging signals related to mutual aid resource requirements between autonomous networks in order to assign an appropriate priority to a mutual aid resource.

BACKGROUND

Narrowband or broadband networks include a number of infrastructure elements for facilitating communications between communication devices. An example of such a narrowband network is a network used by a Project 25 (P25)-compatible two-way Push-To-Talk voice communication system that includes wireless and wired voice communication devices. An example of a broadband network is a wireless data network that operates in accordance with the Long Term Evolution (LTE) signaling standard and that includes wireless and wired communication devices. The communication devices may be, for example, portable narrowband two-way radios, mobile radios, dispatch consoles, Personal Digital Assistants (PDAs), laptops, two-way radios, cell phones or other similar voice and/or data communication devices that communicate with one another via wired and/or wireless networks. Each network can span one or more logical jurisdictions, wherein a jurisdiction is defined by a geographic boundary that includes one or more cells or as defined by geo-coordinates or mapping coordinates, for instance. Each cell represents a geographic coverage area that provides network resources, also termed herein as bearers, for carrying data for wireless devices connected to the network.

As used herein, the term bearer or bearer resource may be a transmission path in a wireless network and is used to carry wireless device data traffic. A bearer may also be a set of network resources (wireless and/or over the wired network) that are allocated for delivery of traffic towards one or more devices in a given network. A bearer can be bidirectional, i.e., having both an uplink path and a downlink path; unidirectional, i.e., having either an uplink path or a downlink path; point-to-multipoint (PTM) (for example a multicast or broadcast bearer associated with one or more devices); or point-to-point (PTP) (for example, a dedicated bearer or a default bearer in an LTE network associated with a single device). A bearer is associated with a set of characteristics or attributes including, but not limited to, Quality of Service (QoS), a carrier frequency at which data is modulated, a particular bandwidth, and/or bit rate.

A public safety system may include one or more autonomous narrowband or broadband networks. Each network has a set of network resources that may be allocated to an emergency event (also referred to herein as an incident), such as a fire or a burglary. During an incident in a specific jurisdiction, incoming emergency calls related to the incident are routed to a computer-aided dispatch (CAD) system associated with the jurisdiction where the incident occurred. The CAD associated with the jurisdiction where the incident occurred (referred to herein as the local CAD) identifies non-network resources (for example, emergency personnel such as firefighters and/or police and/or emergency equipment such as trucks or ambulances) that are needed for responding to the incident. The local CAD uses at least one predefined criterion, for example the incident type, to calculate a priority for the incident. Communication devices associated with or used by the identified non-network resources are assigned the incident priority and the communication devices use local network resources to respond to the incident.

While identifying non-network resources for the incident, the local CAD may determine that there are insufficient non-network resource(s) (resource gap) within the local jurisdiction to adequately respond to the incident. Subsequent to identifying the resource gap, the local CAD may determine that another CAD (a remote CAD) has the non-network resource(s) necessary to fill the resource gap. The remote CAD may be in a network that covers a different jurisdiction. In order to adequately provide all the non-network resource(s) required for responding to the incident, the local CAD may request "mutual aid" resource(s), i.e., the non-network resource(s) required for filling the resource gap, from the remote CAD. The local CAD and the remote CAD communicate with one or more policy charging and rules functions (PCRF) that assign priority to communication devices associated with or used by all non-network resources (mutual aid and local) needed to adequately respond to the incident. It should be noted that the local CAD and the remote CAD may communicate with the same PCRF or different PCRFs. When the local CAD and remote CAD are in two different jurisdictions, the PCRF may be unable to correlate communication devices associated with or used by all non-network resources from the remote jurisdiction with the incident type and incident priority from the local jurisdiction. Therefore, the PCRF may be unable to assign the appropriate incident priority to the mutual aid resource(s) and to the local resources identified for the incident.

Accordingly, there is a need for a method and apparatus for exchanging signals related to mutual aid resource requirements between autonomous networks in order to assign an appropriate priority to a mutual aid resource.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
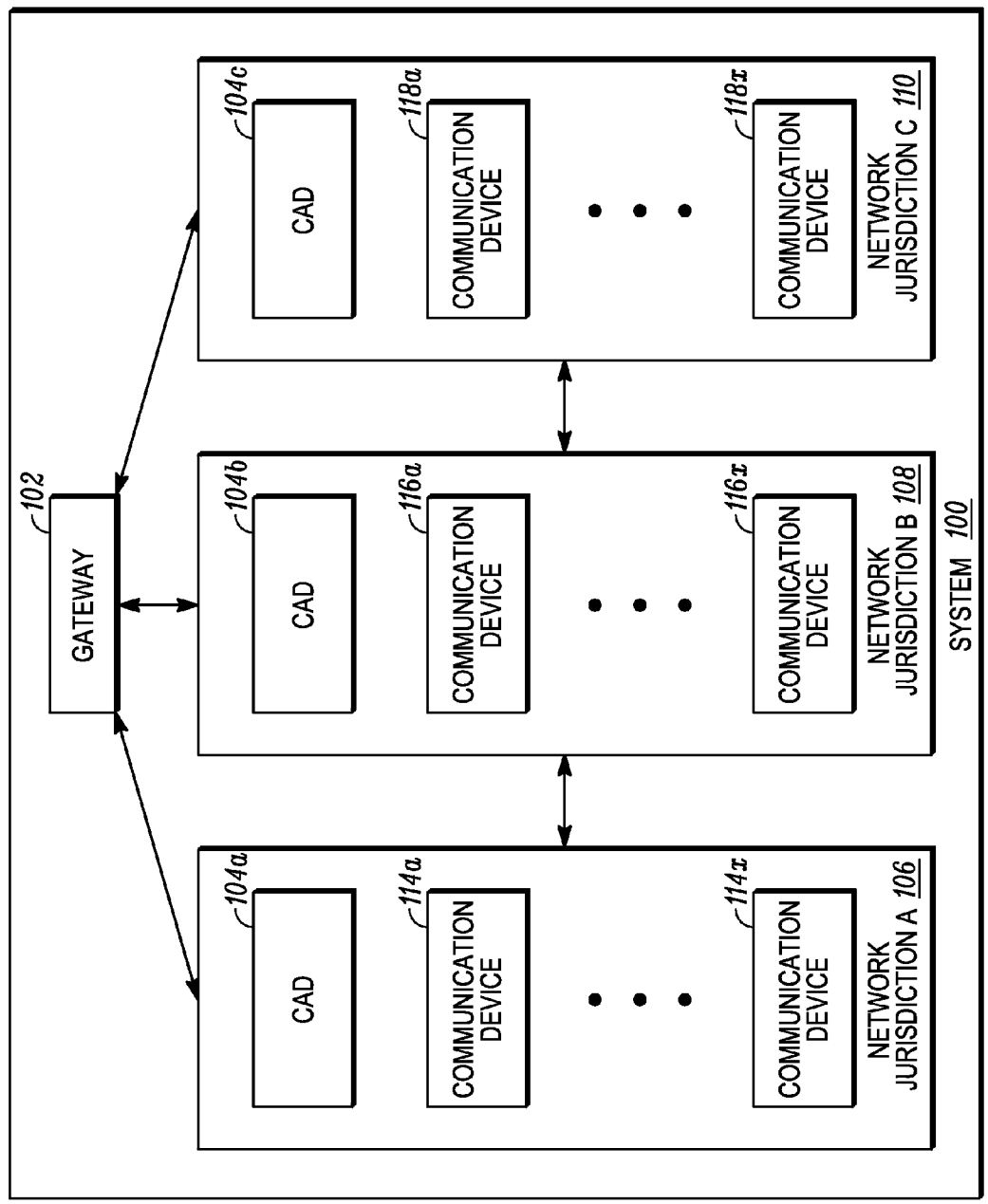
FIG. 1 is a block diagram of a communication system configured to assign an appropriate priority to all resources identified for an incident in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for assigning priority to all resources assigned to an incident. A first dispatch system in a first network assigns at least one network resource in the first network to an incident that occurred in a first jurisdiction. The first dispatch system requests at least one mutual aid resource from at least one second dispatch system in at least one second network subsequent to identifying a resource gap in the first network. The first dispatch system obtains the at least one mutual aid resource from the at least one second dispatch system. A first policy component in the first network receives, from at least one of a first prioritization service in the first network and the at least one second network, at least one of an incident information or a mutual aid information. The first policy component correlates the at least one mutual aid resource with obtained incident information and assigns priority to the at least one network resource and the at least one mutual aid resource.

FIG. 1 is a block diagram of a communication system configured to assign an appropriate priority to all resources identified for an incident in accordance with some embodiments. System 100 includes an interoperability Gateway 102 (for instance a public safety interoperability Gateway (PSIG)), computer aided dispatch (CAD) devices 104a-104c, autonomous networks 106, 108 and 110, and a plurality of communication devices 114 (that is, communication devices 114a-114x), 116 (that is, communication devices 116a-116x), and 118 (that is, communication devices 118a-118x). The networks 106, 108, and 110 can all be of the same network type or a combination of different network types. For instance, networks 106, 108, and 110 can be different types of cellular networks, 4G networks, 3G networks, broadband networks, or narrowband networks. Each network 106, 108, and 110 can span one or more logical jurisdictions.

Communication devices 114, 116, and 118 may be any type of communication device, for example, radios, mobile phones, mobile data terminals, Personal Digital Assistants (PDAs), laptops, two-way radios and/or cell phones. Each of communication devices 114, 116, and 118 uses one or more bearers allocated to the communication device to send and receive media over networks 106, 108, and/or 110 to which the communication device is attached. Each CAD 104a-104c uses one or more of the allocated bearers to communicate with communication devices 114, 116, and 118 and each CAD 104a-104c may operate in a public safety agency (also referred to herein simply as an "agency"). Each CAD 104a-104c manages resources within its jurisdiction. When there is a resource gap, each CAD 104a-104c may be preconfigured to identify mutual aid resources within other jurisdictions.

During an incident, such as an emergency event including a fire or a burglary in a jurisdiction, for example jurisdiction A associated with network 106, incoming emergency calls related to the incident are routed to CAD 104a. CAD 104a identifies resources that are needed for responding to the incident and uses at least one predefined criterion, for example the incident type, to calculate a priority for the incident. Resources identified for responding to the incident may be one or more of communication devices 114, 116, and 118. While identifying resources for the incident, CAD 104a may determine that there is a resource gap within jurisdiction A, i.e., there are insufficient resources within jurisdiction A to adequately respond to the incident. Subsequent to identifying the resource gap, CAD 104a may determine that another CAD (for example, CAD 104b in a different jurisdiction, that is, jurisdiction B (associated with network 108), has the resources necessary to fill the resource gap. CAD 104a is configured to assign local resources within jurisdiction A to the incident and to request "mutual aid" resource(s), i.e., the resource(s) required for filling the resource gap, from CAD 104b.

Some embodiments, therefore, provide an avenue for signaling mutual aid resource requirements between autonomous networks, for example networks 106 and 108. Subsequent to receiving a mutual aid request, CAD 104b processes the mutual aid resource request at its QoS policy function and evaluates the request against local QoS policy. CAD 104b initiates and sends to CAD 104a the necessary signaling, for example, one or more of a mutual aid incident agency identification, a mutual aid flag, and the network resource attributes for a mutual aid resource. CAD 104a allocates network resource(s) for the mutual aid resource based on a mutual aid status and local network QoS policy. The policy control and rules functions (PCRF) used by CAD 104a provides an acknowledgement that a network resource is allocated for the mutual aid resource to the PCRF used by CAD 104b. In some embodiments, the PCRF of CAD 104a determines the priority for the mutual aid resource within the geographic boundaries of the mutual aid jurisdiction, i.e., jurisdiction A. In other embodiments, the PCRF of CAD 104b determines the mutual aid resource priority within the geographic boundaries of the mutual aid jurisdiction. In either case, in order to determine the priority for the mutual aid resource, the PCRF(s) used by CAD 104a and/or CAD 104b correlate mutual aid resource(s) from jurisdiction B with the incident type and incident priority from the incident in jurisdiction A. It should be noted that the same or different incident priority may be assigned to local and mutual aid resources, wherein the incident priority assignment may be driven by policy in the local (home) PCRF. Therefore, the PCRF of networks 106 and 108 are configured to communicate mutual aid requests and acknowledgements and allocate mutual aid bearers to the mutual aid resources that are to be used for the incident.

Figure 2:
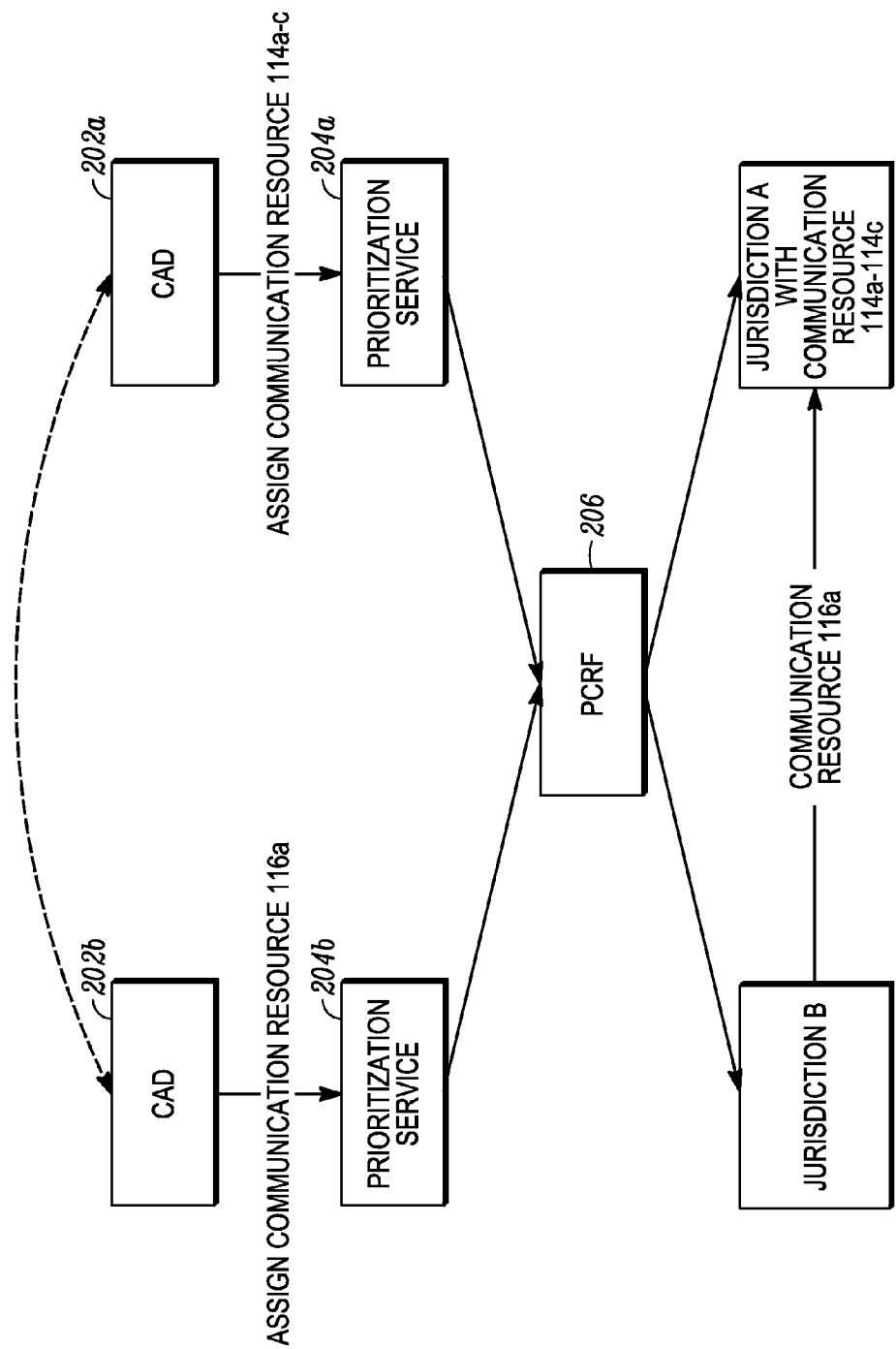
FIG. 2 is a block diagram of an embodiment for assigning priority to all resources associated with an incident when the same policy charging and rules functions (PCRF) are used in accordance with some embodiments.

FIG. 2 is a block diagram of an embodiment for assigning priority to all resources assigned to an incident in accordance with some embodiments. If an incident occurs in, for example, jurisdiction A, CAD 202a, which could be CAD 104a of FIG. 1, assigns local network resources based on the incident type. For example, CAD 202a may assign communication devices 114a-114c to the incident. CAD 202a is associated with a prioritization service 204a that is configured to use or provide the incident type and/or the incident priority to calculate a priority for resources (communication devices 114a-114c) assigned to the incident. In a case where CAD 202a identifies a resource gap, CAD 202a is configured to request mutual aid resource(s) from other jurisdiction(s) that are identified to include the needed resource(s). In this case, CAD 202a is configured to request a mutual aid resource from CAD 202b, which could be CAD 104b of FIG. 1. CAD 202b transfers the requested resource (for example communication device 116a) to CAD 202a. In addition, CAD 202b also sends a request to a prioritization service 204b associated with CAD 202b for prioritization service 204b to calculate a priority for the communication device 116a. Prioritization service 204b sends the international mobile subscriber identity (IMSI) for communication device 116a to a policy charging and rules function (PCRF) 206 used by both CAD 202a and CAD 202b. Prioritization service 204b also sends to PCRF 206 a mutual aid flag to indicate that the resource is being used to provide "aid" for an ongoing incident and the mutual aid jurisdiction, in this case jurisdiction A. Because the PCRF 206 is used by both CAD 202a and CAD 202b, prioritization service 204b requests PCRF 206 to obtain the incident type and/or incident priority from prioritization service 204a. Subsequent to obtaining the incident type and/or incident priority and communication devices 114a-114c from prioritization service 204a, PCRF 206 correlates communication device 116a with the incident type and/or incident priority from jurisdiction A and may assign the same incident priority for communication devices 114a-114c to communication device 116a. In some embodiments, PCRF 206 may assign different incident priority to communication devices 114a-114c and communication device 116a. Thereafter, CAD 202a can successfully use communication device 116a to respond to the incident.

Figure 3:
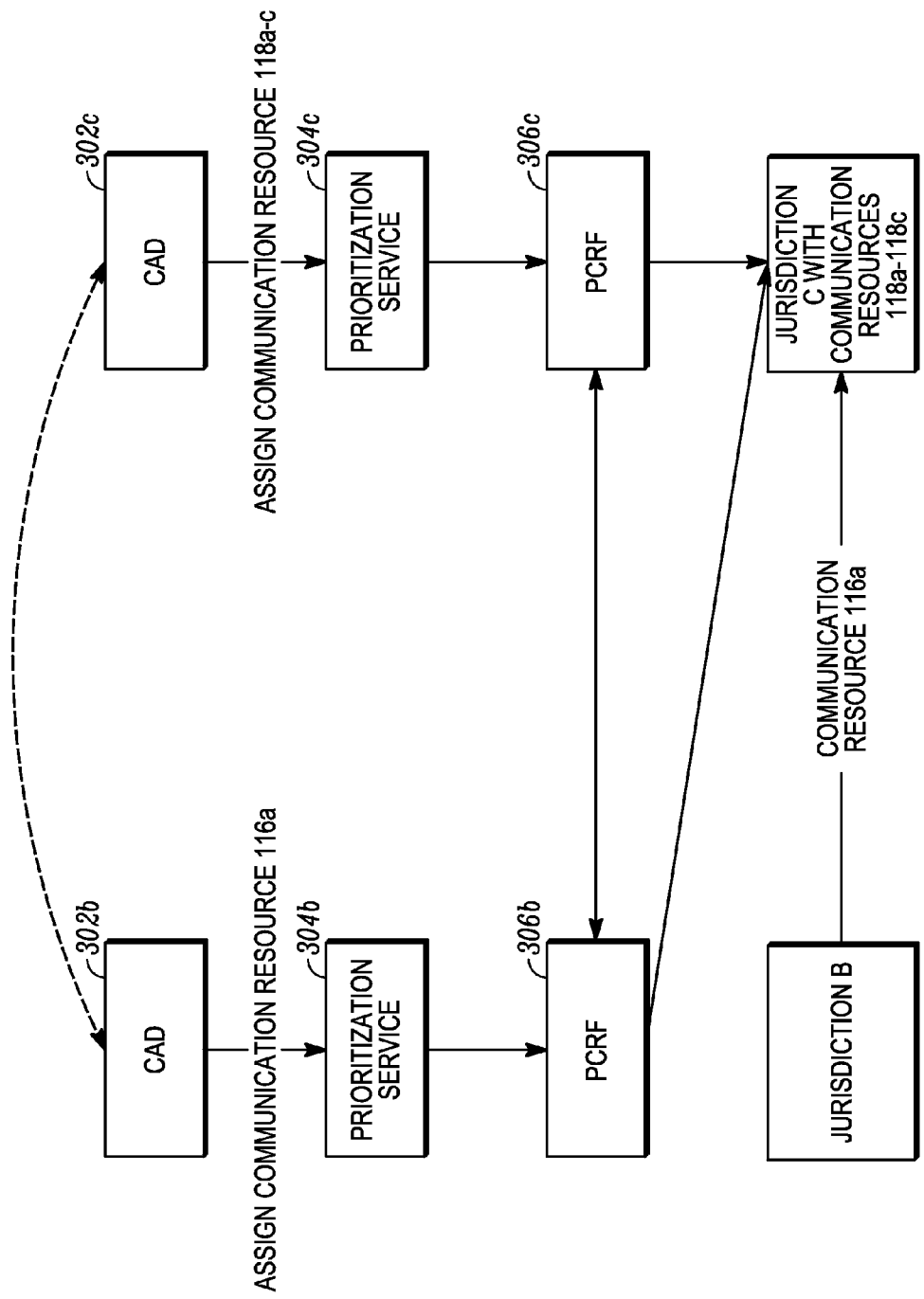
FIG. 3 is a block diagram of an embodiment for assigning priority to all resources associated with an incident when separate PCRFs are used in accordance with some embodiments.

FIG. 3 is a block diagram of an embodiment for assigning priority to all resources associated with an incident when separate PCRFs are used in accordance with some embodiments. Assume that an incident occurs in jurisdiction C (associated with network 110), CAD 302c, which could be CAD 104c of FIG. 1, assigns network resources based on the incident type. For example, CAD 302c may assign communication devices 118a-118c to the incident. CAD 302c is associated with a prioritization service 304c that is configured to use or provide the incident type and/or the incident priority to calculate a priority for resources (communication devices 118a-118c) assigned to the incident. In a case where CAD 302c identifies a resource gap, CAD 302c is configured to request mutual aid resource(s) from other jurisdiction(s) that are identified to include the needed resource(s). For example, CAD 302c is configured to request a mutual aid resource from CAD 302b, which could be CAD 104b of FIG. 1. CAD 302b transfers the requested resource (for example communication device 116a) to CAD 302c without an incident type. In addition, CAD 302b also sends a request to prioritization service 304b for a prioritization service 304b, associated with CAD 302b, to calculate a priority for the requested/mutual aid resource.

Prioritization service 304b sends the IMSI for communication device 116a, a mutual aid flag and the mutual aid jurisdiction (jurisdiction C) to PCRF 306b used by CAD 302b. Prioritization service 304b also requests that PCRF 306b obtain the incident type and/or incident priority from PCRF 306c, used by CAD 302c. The prioritization service 304c also sends to the PCRF 306c the incident type and/or incident priority used to calculate the priority of communication devices 118a-118c. PCRF 306c and PCRF 306b exchange inter-PCRF messages to convey incident related information so that PCRF 306b can assign an incident priority to communication device 116a. For example, PCRF 306b may send a QoS request with a mutual aid flag and mutual aid jurisdiction to PCRF 306c. PCRF 306c may send information associated with the incident to PCRF 306b. PCRF 306b may allocate mutual aid bearers to communication device 116a based on the incident type and incident priority.

Figure 4:
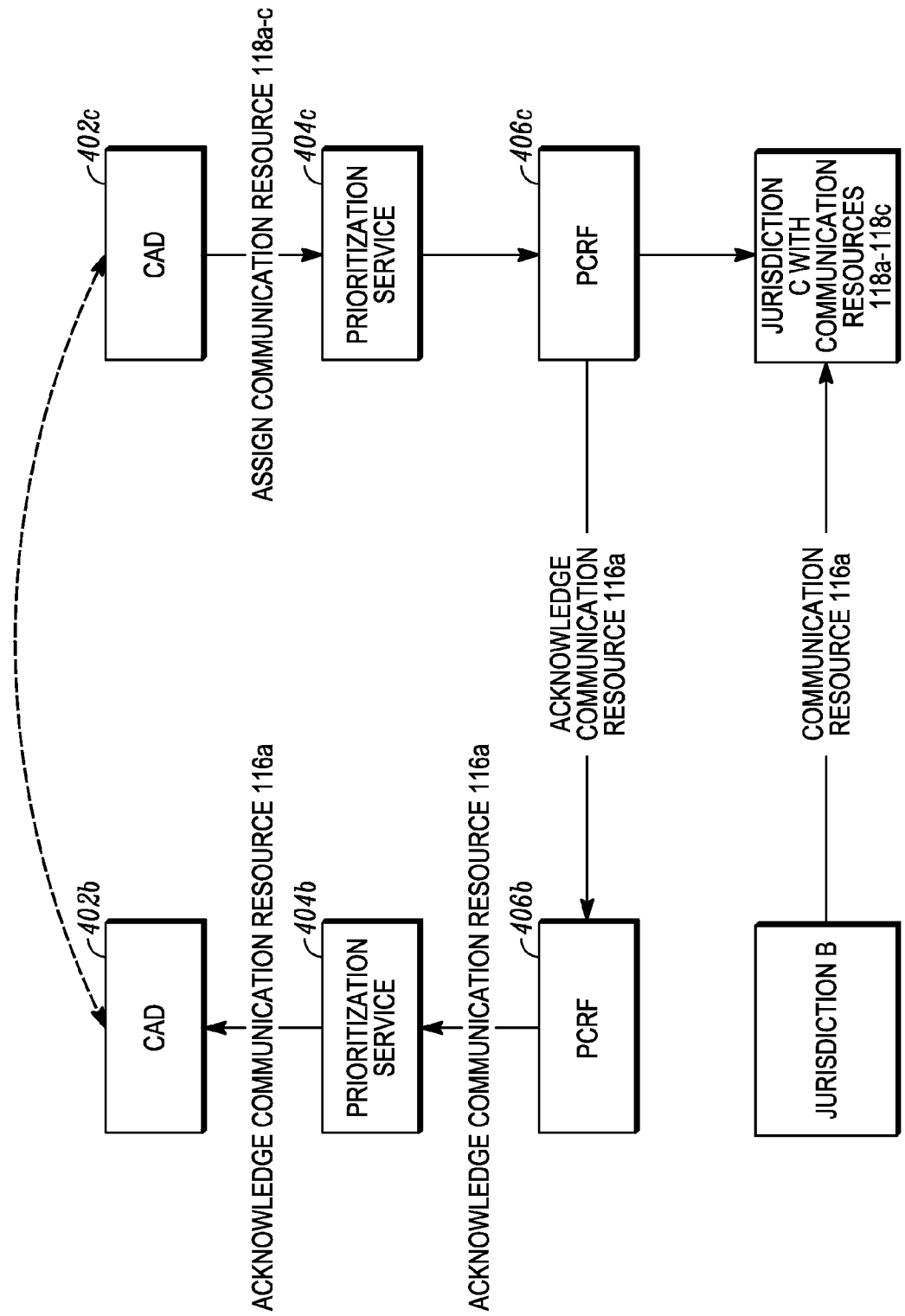
FIG. 4 is a block diagram of an alternate embodiment for assigning priority to all resources associated with an incident when separate PCRFs are used in accordance with some embodiments.

FIG. 4 is a block diagram of another embodiment for assigning priority to all resources assigned to an incident when separate PCRF are used in accordance with some embodiments. For example, if an incident occurs in jurisdiction C, CAD 402c, which could be CAD 104c, assigns network resources based on the incident type. For example, CAD 402c may assign communication devices 118a-118c to the incident. CAD 402c is associated with a prioritization service 404c that is configured to use or provide the incident type and/or the incident priority to calculate a priority for communication devices 118a-118c assigned to the incident. In a case where CAD 402c identifies a resource gap, CAD 402c is configured to request mutual aid resource(s) from other jurisdiction(s) that are identified to include the needed resource(s). In this case, CAD 402c is configured to request a mutual aid resource from CAD 402b, which could be CAD 104b. CAD 402b transfers the requested resource (for example communication device 116a) to CAD 402c. CAD 402c sends a request with the incident type for communication device 116a to prioritization service 404c for prioritization service 404c to calculate a priority for the communication device 116a.

Prioritization service 404c sends to PCRF 406c, used by CAD 402c, the incident type and priority used to calculate the priority of communication devices 118a-118c. Prioritization service 404c also sends, to the PCRF 406c, the IMSI for communication device 116a with mutual aid information. PCRF 406c evaluates the request associated with communication device 116a and allocates mutual aid bearers to communication device 116a based on the incident type and incident priority. PCRF 406c sends an acknowledgment for communication device 116a to PCRF 406b used by CAD 402b. The acknowledgement includes the mutual aid flag and mutual aid jurisdiction. PCRF 406b forwards the acknowledgment to prioritization service 404b, associated with CAD 402b, which forwards to acknowledgement to CAD 402b.

Figure 5:
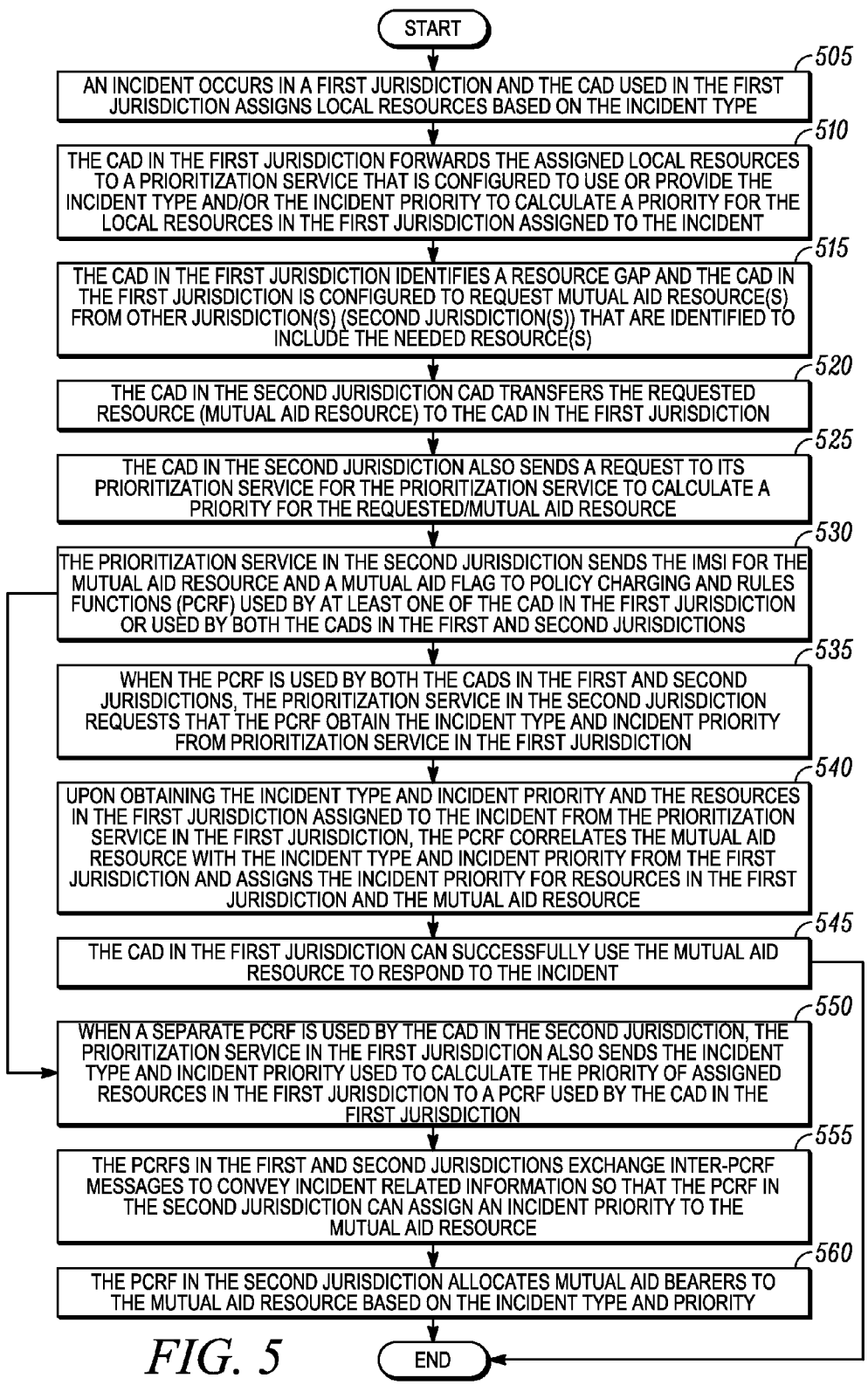
FIG. 5 is a flow diagram for assigning priority to all resources associated with an incident in accordance with some embodiments.

FIG. 5 is a flow diagram for assigning priority to all resources associated with an incident in accordance with some embodiments. In 505, an incident occurs in a first jurisdiction and a CAD used in the first jurisdiction assigns local resources based on the incident type. In 510, the CAD in the first jurisdiction forwards the assigned local resources to a prioritization service that is configured to use or provide the incident type and/or the incident priority to calculate a priority for the local resources in the first jurisdiction assigned to the incident. In 515, the CAD in the first jurisdiction identifies a resource gap and the CAD in the first jurisdiction is configured to request mutual aid resource(s) from other jurisdiction(s) (second jurisdiction(s)) that are identified to include the needed resource(s). In 520, a CAD in the second jurisdiction transfers the requested resource (mutual aid resource) to the CAD in the first jurisdiction. In 525, the CAD in the second jurisdiction also sends a request to its prioritization service for the prioritization service to calculate a priority for the requested/mutual aid resource. In 530, the prioritization service associated with the CAD in the second jurisdiction sends the IMSI for the mutual aid resource to policy charging and rules functions (PCRF) used by the CAD in the first jurisdiction or used by both the CADs in the first and second jurisdictions. The prioritization service also sends to the PCRF a mutual aid flag to indicate that the resource is being used to provide "aid" for an ongoing incident, and the mutual aid jurisdiction, in this case the first jurisdiction.

In 535, when the PCRF is used by both the CADs in the first and second jurisdictions, the prioritization service in the second jurisdiction requests that the PCRF obtain the incident type and incident priority from the prioritization service in the first jurisdiction. In 540, subsequent to obtaining the incident type and incident priority and the resources in the first jurisdiction assigned to the incident from the prioritization service in the first jurisdiction, the PCRF correlates the mutual aid resource with the incident type and incident priority from the first jurisdiction and assigns the incident priority for resources in the first jurisdiction and the mutual aid resource. In 545, the CAD in the first jurisdiction can successfully use the mutual aid resource to respond to the incident.

In 550, when a separate PCRF is used by the CAD in the second jurisdiction, the prioritization service in the first jurisdiction also sends the incident type and incident priority used to calculate the priority of assigned resources in the first jurisdiction to a PCRF used by the CAD in the first jurisdiction. In 555, the PCRFs in the first and second jurisdictions exchange inter-PCRF messages to convey incident related information so that the PCRF in the second jurisdiction can assign an incident priority to the mutual aid resource. For example, the PCRF in the second jurisdiction sends a QoS request with a mutual aid flag and mutual aid jurisdiction to the PCRF in the first jurisdiction and the PCRF in the first jurisdiction sends information associated with the incident to the PCRF in the second jurisdiction. In 560, the PCRF in the second jurisdiction allocates mutual aid bearers to the mutual aid resource based on the incident type and priority.

Figure 6:
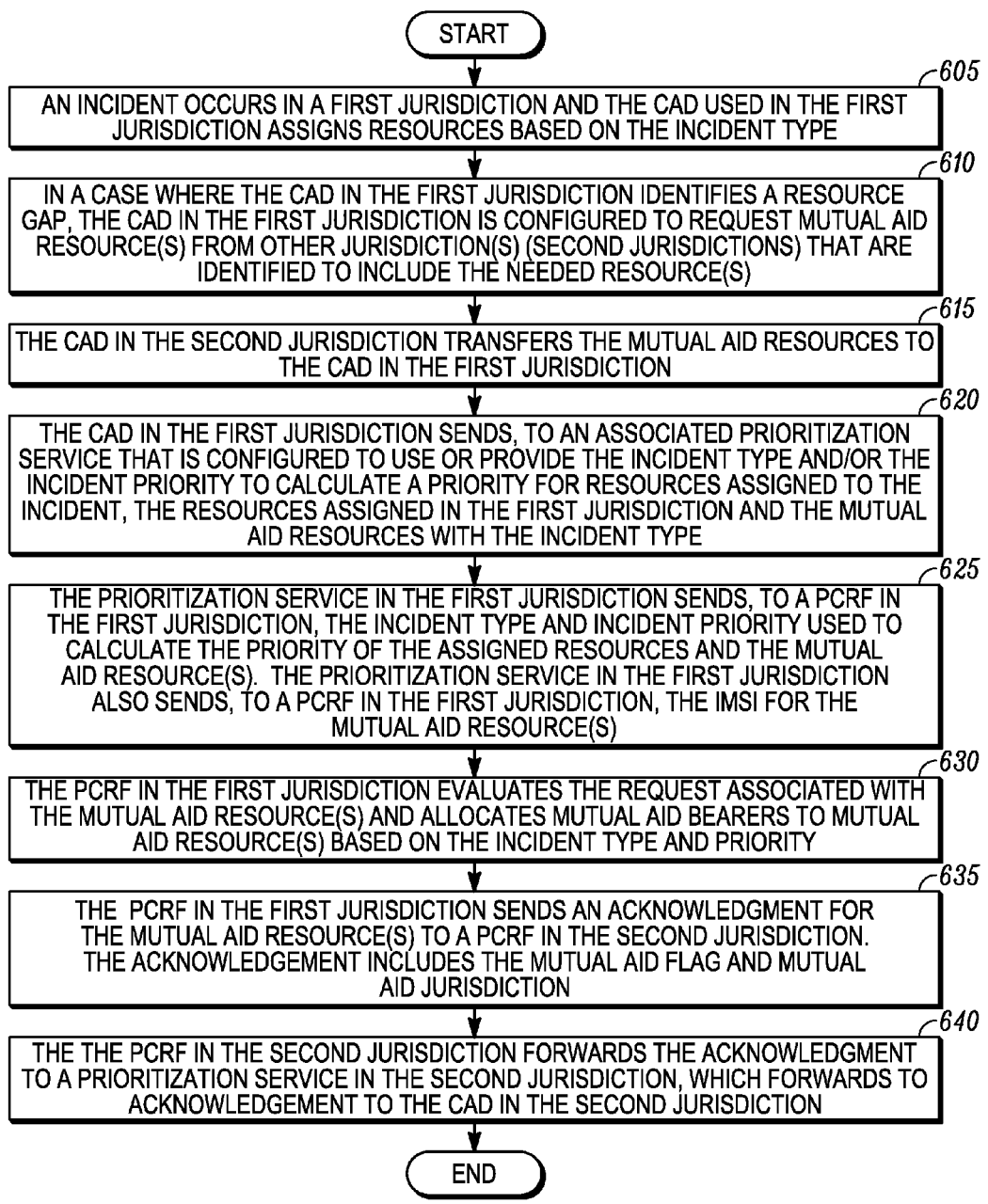
FIG. 6 is another flow diagram for assigning priority to all resources associated with an incident in accordance with some embodiments.

FIG. 6 is another flow diagram for assigning priority to all resources associated with an incident in accordance with some embodiments. In 605, an incident occurs in a first jurisdiction and a CAD used in the first jurisdiction assigns resources to the incident based on the incident type. In 610, in a case where the CAD in the first jurisdiction identifies a resource gap, the CAD in the first jurisdiction is configured to request mutual aid resource(s) from other jurisdiction(s) (second jurisdictions) that are identified to include the needed resource(s). In 615, a CAD in the second jurisdiction transfers the mutual aid resources to the CAD in the first jurisdiction. In 620, the CAD in the first jurisdiction sends, to an associated prioritization service that is configured to use or provide the incident type and/or the incident priority to calculate a priority for resources assigned to the incident, the resources assigned in the first jurisdiction and the mutual aid resource(s) with the incident type.

In 625, the prioritization service in the first jurisdiction sends, to a PCRF in the first jurisdiction, the incident type and incident priority used to calculate the priority of the assigned resources and the mutual aid resource(s). The prioritization service in the first jurisdiction also sends, to the PCRF in the first jurisdiction, the IMSI for the mutual aid resource(s). In 630, the PCRF in the first jurisdiction evaluates the request associated with the mutual aid resource(s) and allocates mutual aid bearers to mutual aid resource(s) based on the incident type and priority. In 635, the PCRF in the first jurisdiction sends an acknowledgment for the mutual aid resource(s) to a PCRF in the second jurisdiction. The acknowledgement includes the mutual aid flag and mutual aid jurisdiction. In 640, the PCRF in the second jurisdiction forwards the acknowledgment to a prioritization service in the second jurisdiction, which forwards to acknowledgement to the CAD in the second jurisdiction.

Figure 7:
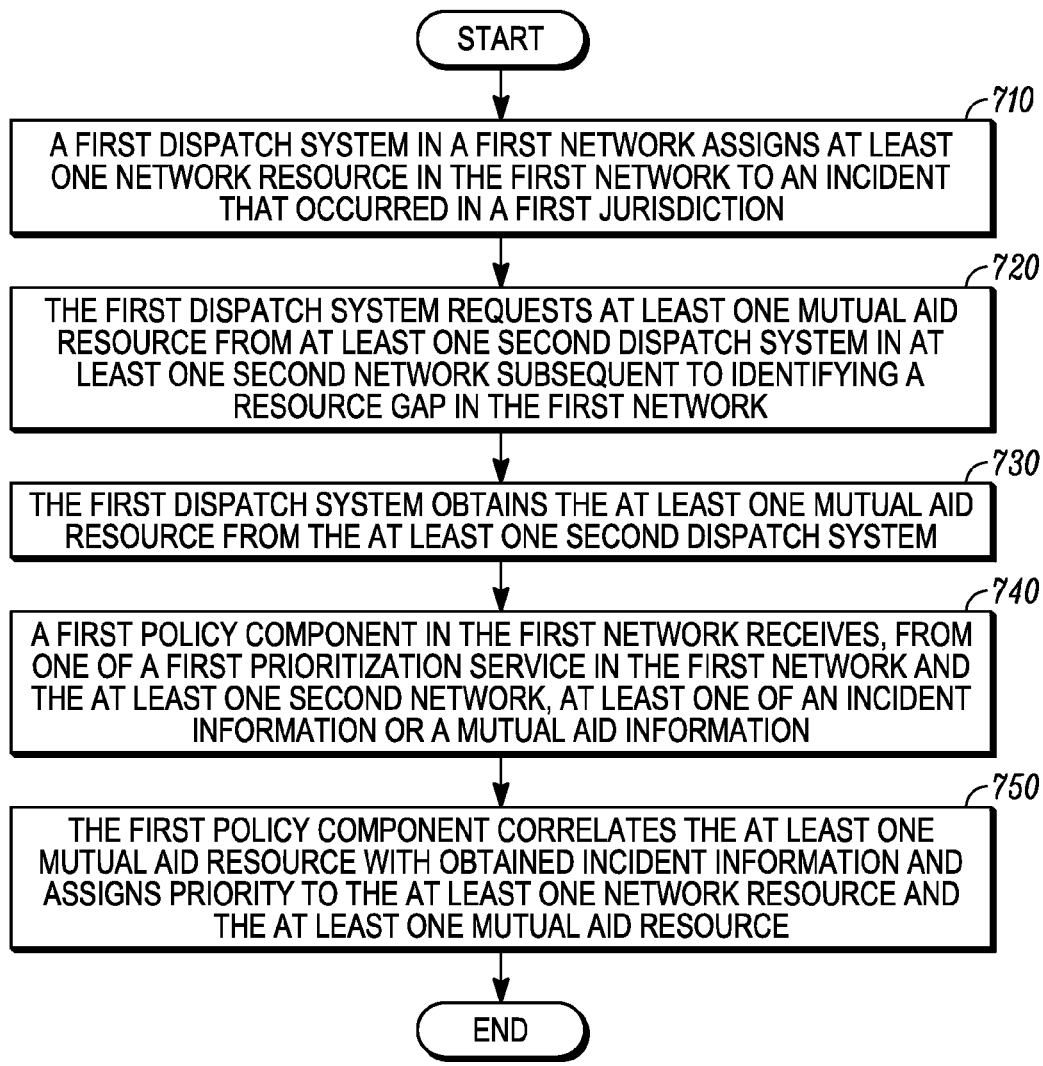
FIG. 7 is another flow diagram for assigning priority to all resources associated with an incident in accordance with some embodiments.

FIG. 7 is another flow diagram for assigning priority to all resources associated with an incident in accordance with some embodiments. In 710, a first dispatch system in a first network assigns at least one network resource in the first network to an incident that occurred in a first jurisdiction. In 720, the first dispatch system requests at least one mutual aid resource from at least one second dispatch system in at least one second network subsequent to identifying a resource gap in the first network. In 730, the first dispatch system obtains the at least one mutual aid resource from the at least one second dispatch system. In 740, a first policy component in the first network receives, from a first prioritization service in the first network and/or from the at least one second network, at least one of an incident information or a mutual aid information. In 750, the first policy component correlates the at least one mutual aid resource with obtained incident information and assigns priority to the at least one network resource and the at least one mutual aid resource.

Figure 8:
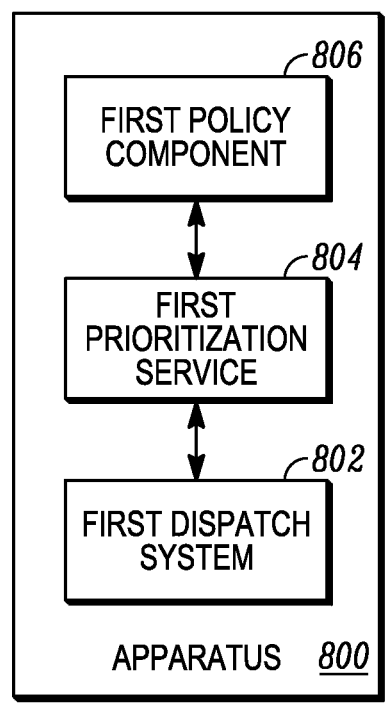
FIG. 8 is a block diagram of an apparatus configured to assign priority to all resources associated with an incident in accordance with some embodiments.

FIG. 8 is a block diagram of an apparatus configured to assign priority to all resources associated with an incident in accordance with some embodiments. The apparatus 800 includes a first dispatch system 802, which operates in a first network. The first dispatch system is configured to assign at least one network resource in the first network to an incident that occurred in a first jurisdiction. The first dispatch system 802 is also configured to request at least one mutual aid resource from at least one second dispatch system in at least one second network subsequent to identifying a resource gap in the first network. The first dispatch system 802 is further configured to obtain the at least one mutual aid resource from the at least one second network. The apparatus 800 also includes a first prioritization service 804, which operates in the first network. The first prioritization service 804 is configured to provide incident information for calculating a priority for the at least one resource. The apparatus 800 further includes a first policy component 806, which also operates in the first network. The first policy component 806 is configured to receive, from at least one of the first prioritization service 804 and the at least one second network, at least one of an incident information and a mutual aid information. The first policy component 806 is also configured to correlate the at least one mutual aid resource with the obtained incident information, and assign priority for the at least one network resource and the at least one mutual aid resource.

Figure 9:
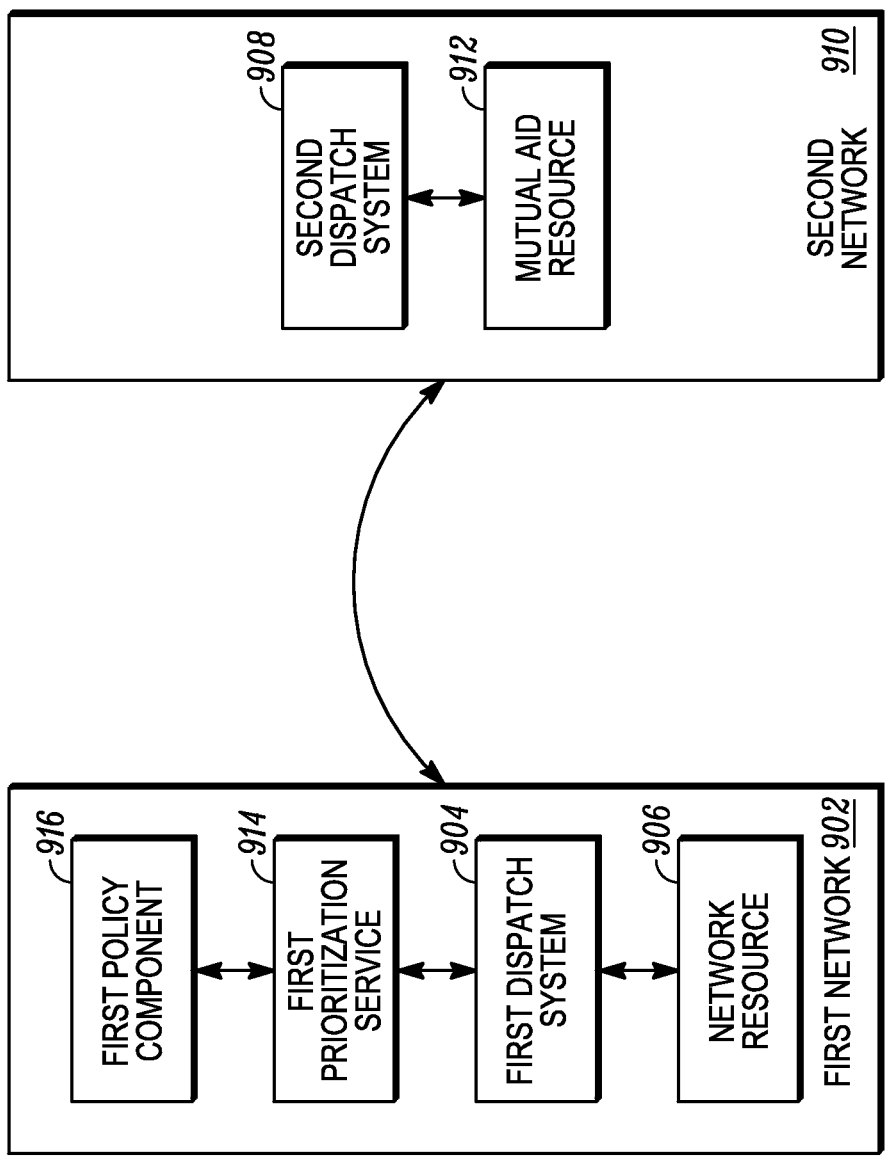
FIG. 9 is a block diagram of a system configured to assign priority to all resources associated with an incident in accordance with some embodiments.

FIG. 9 is a block diagram of a system configured to assign priority to all resources associated with an incident in accordance with some embodiments. The system 900 includes a first network 902 and a second network 910. The first network includes a first dispatch system 904 that is configured to assign the at least one network resource 906 in the first network 902 to an incident that occurred in a first jurisdiction. The second network 910 is configured to provide at least one mutual aid resource 912 from at least one second dispatch system 908 in the at least one second network 910 subsequent to receiving a request from the first dispatch system 904 identifying a resource gap in the first network 902. A first prioritization service 914 that operates in the first network 902 is configured to provide incident information for calculating a priority for the at least one resource 906. A first policy component 916 that operates in the first network 902 is configured to receive, from one of the first prioritization service 914 and the at least one second network 910, at least one of the incident information and a mutual aid information. The first policy component 916 is also configured to correlate the at least one mutual aid resource 912 with the obtained incident information and assign priority for the at least one network resource 906 and the at least one mutual aid resource 912. In the second network 910, the second dispatch system 908 is configured to process a mutual aid request against local policy in the second network and send the mutual aid information to the first policy component 916.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
    assigning, by a first computer-aided dispatch (CAD) system in a first network, at least one network resource in the first network to an incident that occurred in a first jurisdiction;
    requesting, by the first CAD system from at least a second dispatch system in at least one second network and subsequent to identifying a resource gap in the first network, at least one mutual aid resource;
    in response to the requesting, receiving, by the first CAD system from the at least one second dispatch system, the at least one mutual aid resource;
    receiving, by a first policy component implemented by the first network, incident information and mutual aid information, wherein the incident information and mutual aid information is received from one or more of a first prioritization service, implemented by the first network, and the at least one second network;
    correlating, by the first policy component, the received at least one mutual aid resource with the received incident information;
    based on the correlation, calculating a priority for the received at least one mutual aid resource within the geographic boundaries of the first jurisdiction; and
    assigning, by the first policy component, the priority to the received at least one mutual aid resource.

2. The method of claim 1, wherein the incident information includes at least one of an incident type and incident priority and the mutual aid information includes at least one of an identity for the at least one mutual aid resource, a mutual aid flag, and a mutual aid jurisdiction.

3. The method of claim 1, further comprising identifying the at least one network resource needed for responding to the incident and assigning the at least one network resource to the incident based on an incident type.

4. The method of claim 1, wherein subsequent to receiving a mutual aid request, the second dispatch system processes the mutual aid request against local policy in the second network and sends a mutual aid flag, an agency identification and attributes for the least one mutual aid resource to the first policy component.

5. The method of claim 1, wherein subsequent to sending the mutual aid resource to the first CAD system, the second dispatch system sends a request to a second prioritization service associated with the second dispatch system for the second prioritization service to calculate a priority for the mutual aid resource.

6. The method of claim 1, wherein the receiving comprises receiving, by the first policy component, an identity for the at least one mutual aid resource, a mutual aid flag and a mutual aid jurisdiction from a second prioritization service implemented by the at least one second network via a second policy component implemented by the at least one second network.

7. The method of claim 6, wherein the first policy component and the second policy component exchange incident related messages so that the second policy component can allocate at least one mutual aid bearer to the at least one mutual aid resource based on at least one of an incident type or an incident priority.

8. The method of claim 1, wherein subsequent to obtaining, by the first CAD system, the at least one mutual aid resource from the at least one second network, the CAD system sends the at least one mutual aid resource with an incident type to the first prioritization service to calculate a priority for the at least one mutual aid resource.

9. The method of claim 1, wherein assigning comprises assigning, by the second network, the priority to the at least one mutual aid resource.

10. An apparatus comprising:
a first computer-aided dispatch (CAD) system, in a first network, configured to:
assign at least one network resource in the first network to an incident that occurred in a first jurisdiction,
request at least one mutual aid resource from at least one second dispatch system in at least one second network subsequent to identifying a resource gap in the first network, and
in response to the request, receive at least one mutual aid resource from the at least one second network;
wherein the first network is configured to implement a first prioritization service that is configured to provide incident information for calculating a priority for the at least one network resource; and
wherein the first network is configured to implement a first policy component that is configured to:
receive, from at least one of the first prioritization service and the at least one second network, the incident information and a mutual aid information,
correlate the at least one mutual aid resource, received from the at least one second network, with the received incident information,
calculate, based on the correlation, a priority for the at least one mutual aid resource within the geographic boundaries of the first jurisdiction, and
assign the priority to the at least one mutual aid resource.

11. The apparatus of claim 10, wherein the incident information includes at least one of an incident type and incident priority and the mutual aid information includes at least one of an identity for the at least one mutual aid resource, a mutual aid flag and a mutual aid jurisdiction.

12. The apparatus of claim 10, wherein the first computer-aided dispatch system is configured to identify, in the first jurisdiction, the at least one network resource needed for responding to the incident and to assign the at least one network resource to the incident based on an incident type.

13. The apparatus of claim 10, further comprising the second dispatch system and wherein the second dispatch system is configured to, in response to receiving a mutual aid request, process the mutual aid request against local policy in the second network and send a mutual aid flag, an agency identification and attributes for the least one mutual aid resource to the first policy component.

14. The apparatus of claim 10, further comprising the second dispatch system and wherein the second dispatch system is configured to, subsequent to sending the mutual aid resource to the first computer-aided dispatch system, send a request to a second prioritization service associated with the second dispatch system for the second prioritization service to calculate a priority for the mutual aid resource.

15. The apparatus of claim 10, wherein the first policy component is configured to receive an identity for the at least one mutual aid resource, a mutual aid flag and a mutual aid jurisdiction from a second prioritization service implemented by the at least one second network via a second policy component implemented by the at least one second network.

16. The apparatus of claim 15, wherein the first policy component is configured to exchange, with the second policy component, incident related messages so that the second policy component can allocate at least one mutual aid bearer to the at least one mutual aid resource based on at least one of an incident type or an incident priority.

17. The apparatus of claim 10, further comprising:
the at least one second dispatch system, in the at least one second network, configured to provide at least one mutual aid resource responsive to receiving the request from the first computer-aided dispatch system for at least one mutual aid resource, to process the mutual aid request against local policy in the second network, and to send the mutual aid information to the first policy component.

18. The apparatus of claim 17, wherein the second dispatch system is configured to send, subsequent to sending the mutual aid resource to the first dispatch system, a request to a second prioritization service associated with the second dispatch system for the second prioritization service to calculate a priority for the mutual aid resource.

19. The apparatus of claim 17, wherein the at least one second network is configured to implement a second policy component,
wherein the first policy component is configured to receive an identity for the at least one mutual aid resource, a mutual aid flag and a mutual aid jurisdiction from a second prioritization service in the at least one second network via the second policy component, and
wherein the first policy component and the second policy component are configured to exchange incident related messages so that the second policy component can allocate at least one mutual aid bearer to the at least one mutual aid resource based on at least one of an incident type or an incident priority.

20. The apparatus of claim 17, wherein subsequent to obtaining the at least one mutual aid resource from the at least one second network, the first computer-aided dispatch system is configured to send the at least one mutual aid resource with an incident type to the first prioritization service to calculate a priority for the at least one mutual aid resource.

21. The apparatus of claim 10, wherein the first policy component is a policy control and rules functions (PCRF).

* * * * *